Jan. 23, 1951 R. AGUSTONI 2,539,003
PORTABLE MACHINE TOOL
Filed Sept. 30, 1946 2 Sheets-Sheet 2
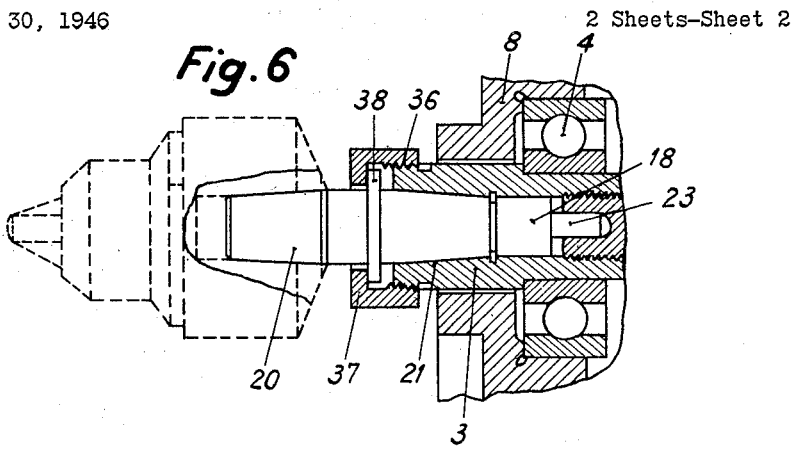
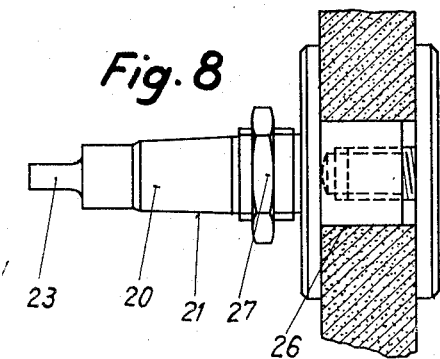
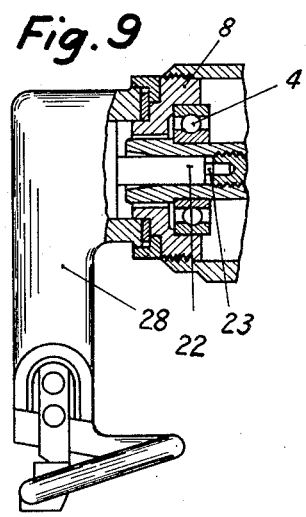
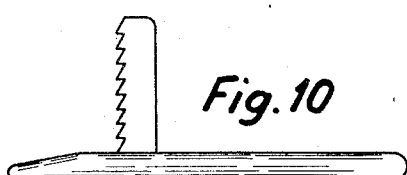
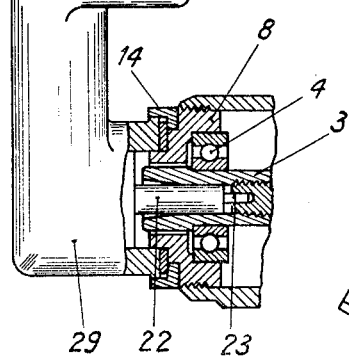
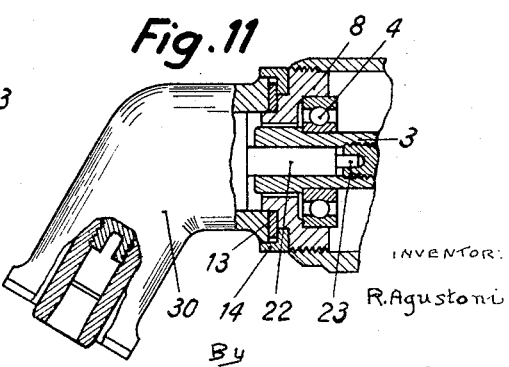
INVENTOR:
R. Agustoni
By Bryant & Lowry
attys.

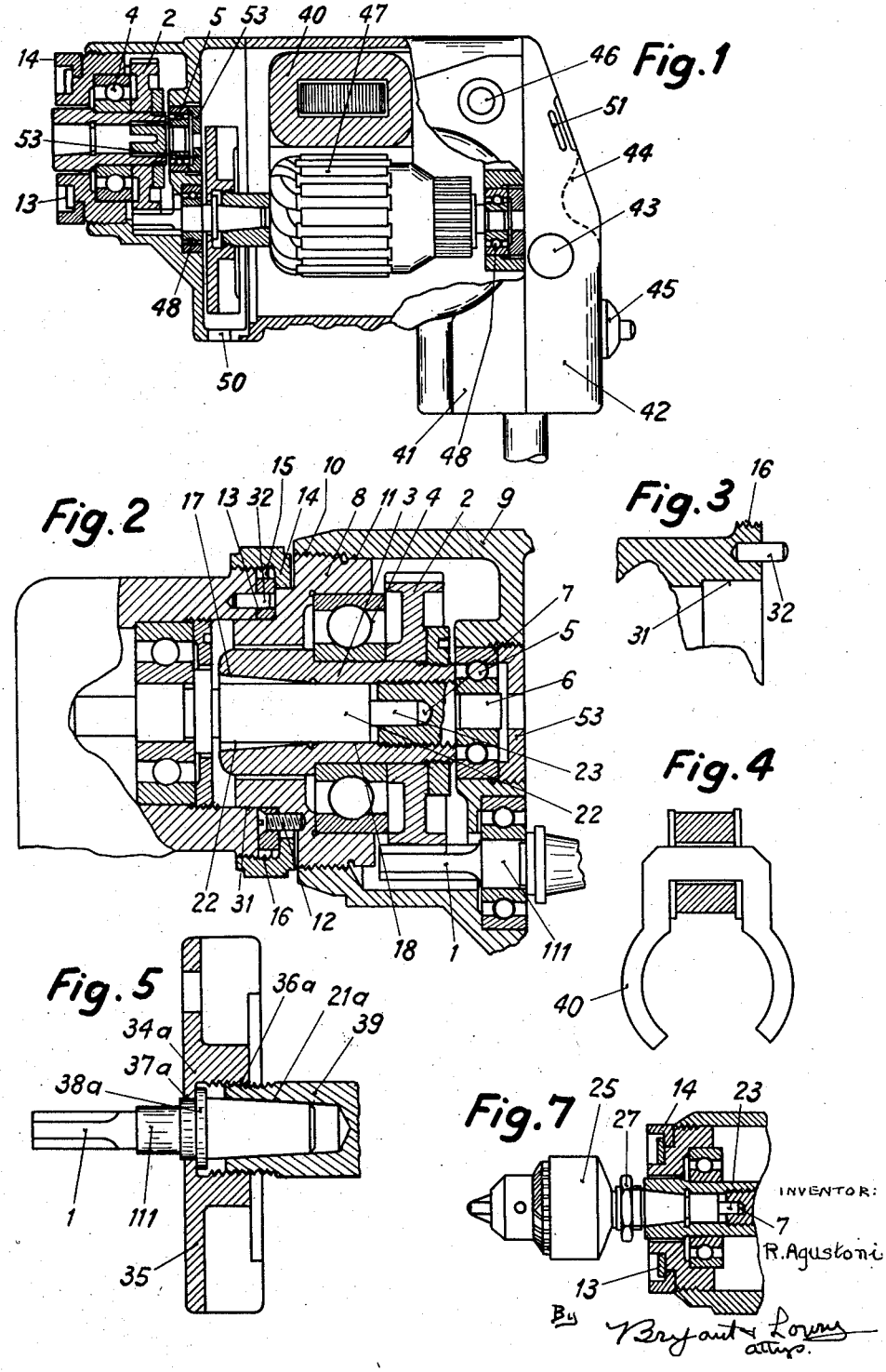

Patented Jan. 23, 1951

2,539,003

UNITED STATES PATENT OFFICE 2,539,003

PORTABLE MACHINE TOOL

Romeo Agustoni, Zurich, Switzerland

Application September 30, 1946, Serial No. 700,289
In Switzerland May 3, 1946

4 Claims. (Cl. 172—36)

The usual types of portable electric or pneumatic machines, such as drills, sheet-metal shears, saws, screw-drivers, tappers, etc., are fitted with individual motors, and each serves for only one purpose, e. g. drilling, cutting, etc.

The present invention relates to a machine that carries out all these operations with a single motor, the motor or its reduction gear being fitted with a flange which permits of setting all the required tools without the need of any additional screwdrivers, spanners etc.

A further improvement of portable machine tools consists in that, instead of the small cog wheel fitted on the armature shaft being cut direct in the motor shaft, this design provides for its being attached thereto, so that in the eventuality of a tooth being broken, the number of teeth being changed, or the wearing down of the teeth it is not necessary to replace the whole rotor.

With a view to giving this portable electric machine a compact design a horseshoe stator of the unipolar type is employed instead of a bipolar stator.

The accompanying drawing illustrates one embodiment of the invention as an example.

In the drawing—

Fig. 1 shows the general arrangement of one embodiment,

Figs. 2 and 3 are cross-sections through the clamping flange,

Fig. 4 is the horseshoe stator of the motor,

Fig. 5 is the cog wheel fitted on the motor shaft,

Fig. 6 is the shaft for the removable drill mandrel,

Fig. 7 is the same with lock nut,

Fig. 8 is the shaft for a grinding wheel,

Figs. 9, 10 and 11 show how a shearing attachment, a saw and an angle attachment can be fitted.

The casing of the tool is formed with two general zones, one of which, the handle zone, carries the power means, the other carrying the assembly by means of which the various work tools can be removably secured to the invention tool for service. The casing contour is of the pistol grip type enabling the tool to be of small dimensions (it is seven inches long and four inches high, five inches at the handle, and weighs four pounds).

Referring first to the connecting zone which is carried by casing portion 9, 1 indicates a drive shaft extending from the power zone, this shaft cooperating with a gear 2 carried by a hollow shaft 3 mounted in spaced-apart bearings 4 and 5, threaded to casing 9 as at 10, bearing 4 being carried by a casing portion 8, with bearing 5 carried by an inwardly extending flange of casing 9. Gear 2 is located intermediate said bearings and serves to drive shaft 3 with the latter designed to provide the power coupling to the applied working tool. To meet the coupling conditions, the interior of hollow shaft is formed with a conical end zone 17 and a cylindrical zone 18, these being axially alined. Shaft 3 has its inner end closed by a threaded element provided with a coupling slot 7 and carrying a projection 6 mounted in bearing 5, thus providing a definite axis of rotation of shaft 3 by gear 2.

Section 8 of the casing is threaded within section 9 and overlies the outer end of shaft 3. It is provided with a shouldered zone adapted to receive a ring 13. Positioned by screws 12 the ring 13 outer face forms an abutment employed in locating the working tool, the ring having a number of spaced openings into any of which a pin 32 carried by such tool can set to lock the tool against rotation relative to the casing. As indicated in Figure 2 an annular space is formed in rear of ring 13 into which the inwardly extending flange of a coupling ring 14 extends, this latter ring being internally threaded for the threading attachment of such working tool.

The power zone includes a motor assembly of the horse-shoe form field magnet type, indicated at 40, to provide a bi-polar motor 47, the axis of the motor being alined with the axis of shaft 1. As indicated in Fig. 5 the shaft 1 is not integral with the motor shaft, the latter being formed with a conical bore 21a designed to receive the conical end zone of the shaft, the shaft carrying a flange 38a by means of which a ring 34a, threaded onto the motor shaft, will provide a drive fit relation between the conical end of shaft 1 and bore 21a. Ring 34a may be provided with vanes to serve as fan blades for cooling the motor. This arrangement permits ready replacement of shaft 1 when desired, a definite advantage since shaft 1 is formed at its free end as a pinion structure designed to drive gear 2.

As will be understood, the bearings 4 and 5, supported by the casing sections, accurately maintain the position of shaft 3, these bearings being spaced apart in the direction of length of the shaft, with gear 2, also carried by shaft 3, positioned between the bearings, thus assuring that the shaft axis will be permanently fixed relative to the casing, making it possible to accurately position the working tools relative to the casing with assurance of accurate drive relation between the shaft and the working tool drive structure, this latter being made possible through the bore arrangement of shaft 3; some work tools (Figs. 9 to 11) employ a cylindrical connection while others utilize a conical connection, as in Figs. 6 and 7, in which form a cylindrical end zone is included to permit the driving tang 23 to engage coupling slot 7, the tang 23 being present with all such working tools.

The shaft 3 is driven from gear 2 through contact of the gear hub with the inner member of bearing 4, a collar threadedly carried by shaft 3 applying pressure on the gear hub and bearing member to tightly clamp the bearing member against an external shoulder of shaft 3, thus locking the shaft, bearing member and gear into a compact driving unit with the shaft accurately centered by bearings 4 and 5.

As indicated in the drawings, the invention tool can be utilized with working tools of different types. For instance, if it is desired to chuck a drill mandrel, Figs. 6 and 8, the shaft 20 of such working tool is inserted in hollow shaft 3, is centered by cone face 17 through cone 21 and driven through tang 23 cooperative with slot 7. The front end of shaft 3 may be threaded, as at 36, by means of which coupling member 37, bearing against collar 38, may force shaft 20 tightly to its seat in shaft 3. A similar action is present in Fig. 7.

On the contrary, if the working tool is provided with a fixed and a rotatable part, as for instance a saw, sheet metal shears, etc., its cylindrical shaft 22 (Fig. 11) is inserted into hollow shaft 3, which centers it through the cylindrical zone 18, and drives it through tang 23 and slot 7. The fixed part of the tool (28, 29, 30—Figs. 9 to 11) is attached to the casing of the gear by coupling ring 14. The tools can be inclined to any direction or be set in a determined position through co-action of pin 32 with one of the holes of ring 13.

The shape of the handle is indicated in Fig. 1, being a prolongation of the motor casing. It may be provided with a boss 43 and a recess 44 for gripping purposes. The switch can be fitted at 45 or 46. Holes 50 and 51 serve for motor ventilation.

While the form of embodiment of the invention as herein disclosed, constitutes a preferred form, it is to be understood that some changes may be made in the arrangement, construction and combination of the various parts of my invention, and it is my intention to cover by my claims such changes as may reasonably be included within the scope thereof.

I claim as my invention:

1. In portable tool assemblies, wherein the operating tool and its driving means form a portable service unit, wherein the drive means forms the power source for a plurality of selective interchangeable tools, and wherein either of such tools may be operatively assembled with the drive means at will, an assembly of such type including a main casing supporting the driving means, and means for detachably securing a selected tool in operative relation to the casing and the driving means to constitute the casing as a carrier for the unit, said means including a cup-shaped shaft fixedly positioned within the main casing relative to the driving means and driven thereby through gear connections, said shaft being adapted to receive the drive spindle of the selected tool to produce a drive relation between the tool and the power source, a zone of the side wall of the shaft cavity being of uniform diameter with an adjacent zone of conical formation having its greatest diameter in the lip zone of the cavity to thereby permit mounting of a tool the spindle of which may be either circular or conical in form, the bottom wall of the cavity having an axial depression of non-circular contour adapted to receive a projection of complemental contour carried by the free end of the tool spindle to thereby produce the drive connection to the tool, said gear connections including a gear mounted on an intermediate zone in the length of the shaft, said shaft being supported by the casing through non-friction bearings on each side of said gear with the gear in driving contact with one of said bearings to thereby maintain the shaft axis in definite position relative to the casing and to provide shaft drive by said gear.

2. An assembly as in claim 1 characterized in that one of the non-friction bearings is carried directly by the casing with the other bearing carried by an annular element removably secured to the casing and carrying a zone operative as a centering means for the casing of the tool to thereby axially aline the tool spindle with the shaft axis.

3. An assembly as in claim 2 characterized in that the element is formed with a plurality of external seats differing as to diametrical length, the outer seat being threaded for connection with the main casing, with the inner seat forming the centering structure for the tool casing, an intermediate zone of the element carrying an annular member external of the inner seat with the member cooperative with the tool casing to control the position arcuately of the tool casing relative to the main casing and to co-operate with an annular internally-threaded ring co-operative with the tool casing for securing the latter to the main casing.

4. In portable tool assemblies, wherein the operating tool and its driving means form a portable service unit, wherein the drive means forms the power source for a plurality of selective interchangeable tools, and wherein either of such tools may be operatively assembled with the drive means at will, an assembly of such type including a main casing supporting the driving means, and means for detachably securing a selected tool in operative relation to the casing and the driving means to constitute the casing as a carrier for the unit, said means including a cup-shaped shaft fixedly positioned within the main casing relative to the driving means and driven thereby through gear connections, said shaft being adapted to receive the drive spindle of the selected tool to produce a drive relation between the tool and the power source, a zone of the side wall of the shaft cavity being of uniform diameter with an adjacent zone of conical formation having its greatest diameter in the lip zone of the cavity to thereby permit mounting of a tool the spindle of which may be either circular or conical in form, the bottom wall of the cavity having an axial depression of non-circular contour adapted to receive a projection of complemental contour carried by the free end of the tool spindle to thereby produce the drive connection to the tool, said shaft and its cavity formation being of composite type with the bottom of the cavity presented by a threaded member secured internally of the shaft and having the non-circular depression, said member carrying a seat for a non-friction bearing.

ROMEO AGUSTONI.

REFERENCES CITED

The following references are of record in the file of this patent:

UNITED STATES PATENTS

| Number | Name | Date |
|---|---|---|
| 975,522 | Gross et al. | Nov. 15, 1910 |
| 990,545 | Gross et al. | Apr. 25, 1911 |
| 1,965,669 | Robb | July 10, 1934 |
| 2,024,276 | De Soatter | Dec. 17, 1935 |
| 2,350,631 | Mitchell | June 6, 1944 |